US007729990B2

(12) United States Patent  (10) Patent No.: US 7,729,990 B2
Marceau et al.  (45) Date of Patent: Jun. 1, 2010

(54) CHECK IMAGE ACCESS SYSTEM

(76) Inventors: Stephen Michael Marceau, 215 Tomahawk, San Antonio, TX (US) 78232; Robert Leland Jensen, 1983 Oakwell Farms Pkwy., Apt. 419, San Antonio, TX (US) 78216; Daniel Victor Smith, 2210 Bedford Stage, San Antonio, TX (US) 78213; Damon Leigh Herrin, 706 Sonnett, San Antonio, TX (US) 78216

( * ) Notice: Subject to any disclaimer, the term of this patent is extended or adjusted under 35 U.S.C. 154(b) by 871 days.

(21) Appl. No.: 10/824,792

(22) Filed: Apr. 14, 2004

(65) Prior Publication Data

US 2004/0260636 A1  Dec. 23, 2004

Related U.S. Application Data

(63) Continuation-in-part of application No. 10/449,306, filed on May 28, 2003, now abandoned.

(51) Int. Cl.
 *G06Q 40/00* (2006.01)
(52) U.S. Cl. .......................................... 705/45; 705/35
(58) Field of Classification Search ................. 705/45, 705/35; 707/104; 382/305
 See application file for complete search history.

(56) References Cited

U.S. PATENT DOCUMENTS

| | | | |
|---|---|---|---|
| 4,815,029 A | 3/1989 | Barker et al. |
| 4,955,056 A | 9/1990 | Stentiford |
| 5,134,564 A | 7/1992 | Dunn et al. |
| 5,201,046 A | 4/1993 | Goldberg et al. |
| 5,222,234 A | 6/1993 | Wang et al. |
| 5,251,294 A | 10/1993 | Abelow |
| 5,297,249 A | 3/1994 | Bernstein et al. |
| 5,367,621 A | 11/1994 | Cohen et al. |
| 5,446,891 A | 8/1995 | Kaplan et al. |
| 5,455,945 A | 10/1995 | VanderDrift |
| 5,519,865 A | 5/1996 | Kondo et al. |
| 5,535,382 A | 7/1996 | Ogawa |

(Continued)

FOREIGN PATENT DOCUMENTS

EP  0446634 A  9/1991

OTHER PUBLICATIONS

Sheryl Canter, Folio Web Retriever, PC Magazine "The 1997 Utility Guide", 1997, Ziff-Davis Inc. New.

(Continued)

*Primary Examiner*—Thu Thao Havan
(74) *Attorney, Agent, or Firm*—Hanor, Lively & Cernyar, PLLC (57) ABSTRACT

Systems and methods of processing financial transaction information are provided. In one embodiment, a financial institution runs an index generating software program to generate a downloadable index of images of cleared checks. The account customer uses complementary software to remotely download, search, and display the index of cleared check images, together with the images themselves. In another embodiment, the financial institution periodically runs a software program to generate digital archives of the cleared check images for the account customer. The account customer is provided with secure online access to the digital archives. The account customer may use standard financial bookkeeping software to download and display the cleared check images and associate the cleared check images with transactions in the associated account registers.

32 Claims, 8 Drawing Sheets

U.S. PATENT DOCUMENTS

| | | | |
|---|---|---|---|
| 5,537,586 A | 7/1996 | Amram et al. | |
| 5,544,352 A | 8/1996 | Egger | |
| 5,557,722 A | 9/1996 | DeRose et al. | |
| 5,649,186 A | 7/1997 | Ferguson | |
| 5,652,880 A | 7/1997 | Seagraves | |
| 5,659,742 A | 8/1997 | Beattie et al. | |
| 5,678,041 A | 10/1997 | Baker et al. | |
| 5,678,046 A | 10/1997 | Cahill et al. | |
| 5,687,367 A | 11/1997 | Dockter et al. | |
| 5,706,502 A | 1/1998 | Foley et al. | |
| 5,717,913 A | 2/1998 | Driscoll | |
| 5,721,908 A | 2/1998 | Lagarde et al. | |
| 5,742,816 A | 4/1998 | Barr et al. | |
| 5,752,242 A | 5/1998 | Havens | |
| 5,752,244 A | 5/1998 | Rose et al. | |
| 5,754,840 A | 5/1998 | Rivette et al. | |
| 5,774,123 A | 6/1998 | Matson | |
| 5,797,619 A | 8/1998 | Bauer et al. | |
| 5,822,539 A | 10/1998 | van Hoff | |
| 5,832,494 A | 11/1998 | Egger et al. | |
| 5,832,495 A | 11/1998 | Gustman | |
| 5,832,499 A | 11/1998 | Gustman | |
| 5,842,206 A | 11/1998 | Sotomayor | |
| 5,852,820 A | 12/1998 | Burrows | |
| 5,874,717 A | 2/1999 | Kern et al. | |
| 5,875,441 A | 2/1999 | Nakatsuyama | |
| 5,889,958 A | 3/1999 | Willens | |
| 5,890,172 A | 3/1999 | Borman et al. | |
| 5,895,461 A | 4/1999 | De La Huerga et al. | |
| 5,899,999 A * | 5/1999 | De Bonet | 707/104.1 |
| 5,903,881 A | 5/1999 | Schrader et al. | |
| 5,920,859 A | 7/1999 | Li | |
| 5,924,090 A | 7/1999 | Krellenstein | |
| 5,961,602 A | 10/1999 | Thompson et al. | |
| 5,987,454 A | 11/1999 | Hobbs | |
| 6,012,053 A | 1/2000 | Pant et al. | |
| 6,038,668 A | 3/2000 | Chipman et al. | |
| 6,092,074 A | 7/2000 | Rodkin et al. | |
| 6,092,080 A | 7/2000 | Gustman | |
| 6,098,064 A | 8/2000 | Pirolli | |
| 6,101,492 A | 8/2000 | Jacquemin et al. | |
| 6,105,044 A | 8/2000 | DeRose et al. | |
| 6,112,203 A | 8/2000 | Bharat et al. | |
| 6,122,647 A | 9/2000 | Horowitz et al. | |
| 6,134,584 A | 10/2000 | Chang et al. | |
| 6,138,113 A | 10/2000 | Dean et al. | |
| 6,163,779 A | 12/2000 | Mantha et al. | |
| 6,181,837 B1 * | 1/2001 | Cahill et al. | 382/305 |
| 6,199,060 B1 | 3/2001 | Gustman | |
| 6,212,527 B1 | 4/2001 | Gustman | |
| 6,247,018 B1 | 6/2001 | Rheaume | |
| 6,272,534 B1 | 8/2001 | Guha | |
| 6,275,820 B1 | 8/2001 | Navin-Chandra et al. | |
| 6,292,894 B1 | 9/2001 | Chipman et al. | |
| 6,721,783 B1 | 4/2004 | Blossman et al. | |
| 7,403,916 B1 | 7/2008 | Brownell et al. | |
| 2001/0018739 A1 * | 8/2001 | Anderson et al. | 713/176 |
| 2001/0056387 A1 | 12/2001 | Magary et al. | |
| 2002/0103756 A1 | 8/2002 | Andrews et al. | |
| 2002/0145035 A1 | 10/2002 | Jones | |
| 2002/0152164 A1 * | 10/2002 | Dutta et al. | 705/43 |
| 2003/0126075 A1 | 7/2003 | Macavage, III et al. | |
| 2003/0187796 A1 | 10/2003 | Swift et al. | |
| 2003/0225663 A1 | 12/2003 | Horan et al. | |

OTHER PUBLICATIONS

Rus D. and Subramanian, D. "Information Retrieval, Information Structure, and Information Agents".

Hastings, B. "WebEx: Download Now, Hyperbrowse Later", PC World, vol. 14, No. 10, Oct. 1996, p. 98.

Bethoney H. "Save it for Later with WebClip; Offline Browser Eases Organization of Downloaded Pages".

Wang, W. and Rada, R. "Experiences with Semantic Net Based Hypermedia", Int'l. J Human-Computer Stud.

Folio Corporation, "Folio Views 3.1 Infobase Management Software: Infobase Production Kit V. 3.1".

Folio Corporation, "Folio Views 4.0 Getting Started". Oct. 25, 1996.

Duncan, T. and M. Mckell, "Making Network Information Accessible with FolioViews 4.11", Novell NetNo.

Mendelson, E. "Off-Line Browsers", in the 1997 Utility Guide, P.C. Magazine, vol. 16, No. 7, Apr. 8.

Haskin, D. "Taming the Net", Computer Shopper, vol. 16, No. 12, Dec. 1996, pp. 576-583.

Folio Corporation, Folio announces new IomegaReady software version of Folio Web Retriever is now.

Heck, M. "Web Retriever Converts Sites into Editable Databases", InfoWorld, Oct. 7, 1996, p. IW4.

Seybold Publications Inc., "Editorial Aid—The Offline Browser", Seybold Report on Desktop Publishing.

Folio Corporation, "Folio Corporation announces Folio Web Retriever 2.0", release Jun. 17, 1996.

Ellis, D. et al. On the Measurement of Inter-Linker Consistency and Retrieval Effectiveness in Hype.

Zheng, M. and Rada R. "Text-Hypertext Mutual Conversion and Hypertext Interchange through SGML".

Rada, R. "Converting a Textbook to Hypertext", ACM Transactions on Information Systems, vol. 10 N. 3.

Coombs, J.H. "Hypertex, Full Text, and Automatic Linking", Proceedings of the 13th International Con.

Bethoney, H. "Folio Views Creates Info Databases", PC Week, vol. 11, No. 44, Nov. 7, 1994, p. 129.

Folio Corporation, "Folio Views 2.1 Infobase Users Guide", Jun. 1991. QA76.7555.F65 1991.

Akshmanan, L.V.S., Sadri, F., Subramanian, I.N., A Declarative Language for Querying and Restructur.

Voight, K. Skipper: A Tool that Lets Browsers Adapt to Changes in Document Relevance to Its User.

Genesereth, M.R., Keller, A.M., Duschka, O.M. Informaster: An Information Integration System, 539-.

Ashish, N. and Knoblock, C.A., Wrapper Generation for Semi-structured Internet Source. 8-15,SIGMOND.

Atzeni, Paolo, Mecca Gianssalvatore, Marialdo Paolo, "Semistructured and Structured Data in the Web".

McHugh, J. and Widom, J. Integrating Dynamically-Fetched External information into a DBMS for Semi.

Nado, R.A. and Huffman, S.B., "Extracting Entity Profiles from Semistructured Information Spaces" 32.

Nestorov, S., Abiteboul, S. and Motwani, R. Inferring Structure in Semistructured Data, 39-43, SIGM.

* cited by examiner

Fig. 9

CHECK IMAGE ACCESS SYSTEM

RELATED APPLICATIONS

This application claims priority to and is a continuation-in-part of U.S. patent application Ser. No. 10/449,306 for a "Financial Transaction Information Capturing and Indexing System," filed May 28, 2003, now abandoned which is herein incorporated by reference.

FIELD OF THE INVENTION

The invention relates generally to systems for accessing information, and more particularly, to systems for accessing financial transaction information.

BACKGROUND OF THE INVENTION

For well over a decade, individuals and small businesses have had access to financial software packages, such as the Intuit Corporation's Quicken® software, to electronically store information about financial transactions. For much of that time, software has been available to download financial transaction information from financial institutions. Many financial institutions have made check images available to customers online. The check images can be copied or downloaded onto the computer of the customer. Those downloads, however, typically failed to reveal the payee named on the check, requiring software users to keep separate records—such as carbon copies of the checks—of the check number and payee, and then to manually enter such information into their financial transaction tracking software. Recently, it has been possible to download text information from credit cards and bank accounts into applications like Quicken and Quickbooks.

Also, existing financial software packages inadequately prepare taxpayers for an audit. During an audit, revenue officials often demand copies of cancelled or processed checks. But existing financial software packages lack any means for capturing and storing images of the processed checks and linking the images to a data file containing the key information on the checks. One known method of providing customers with check information has been to copy the information onto a CD-Rom and mail it to the customer. Because of the large size of the daily or monthly transactions, the downloading of statements and check images has not been simple and in many cases has not been practical.

Therefore, there is a long felt, but unmet meet, for improved financial transaction systems that are capable of automatically incorporating check image data, reducing the burdens of manual entry of payee information, or both by supplying the information in usable digital form.

There is also a need for system and software tools for capturing, organizing, and perusing financial transaction information, including the check images. Financial institutions such as banks, credit unions, and saving and loan institutions are currently spending large amounts of money to store or scan and archive images of the billions of cancelled checks, deposit slips, and other financial documents that they process every year. Some of these institutions mail copies of cancelled checks to their customers at great expense. The check images can also be downloaded. To reduce those expenses, others make their customers' account information, including check and deposit slip images, available to their customers online. The account information has also been made available on CD-Roms.

The customers of these financial institutions, however, have no efficient way of making a permanent record and searchable archive of the cancelled check or deposit slip images. Instead, such customers are typically required to open each check image individually, one at a time, and print or locally save the check image. For high-transaction-volume customers, this is an exceedingly time-consuming exercise. Needless to say, there is a substantial need for an efficient method of making a permanent and searchable database of a customer's check and deposit slip images.

SUMMARY OF THE INVENTION

This invention is directed to, but not limited by, one or more of the following objects, separately or in combination:
- a system and method enabling a financial institution to deliver an electronic financial statement to a customer including financial check and transaction images and a searchable index;
- generating an index (which may comprise one or more files) of financial transaction information, including check images (which may be part of or separate from the index), at a remote website;
- providing a customer of a financial institution with access to either the check image index, the check images, or both;
- enabling the customer to download either the check image index, the check images, or both, to a personal computer; and
- providing a software utility for the customer's personal computer capable of one or more of the following functions: perusing the downloaded check images, linking or cross-indexing the downloaded check images with other data about the financial transaction, and searching the downloaded check image index.

DETAILED DESCRIPTION

Figure 1:
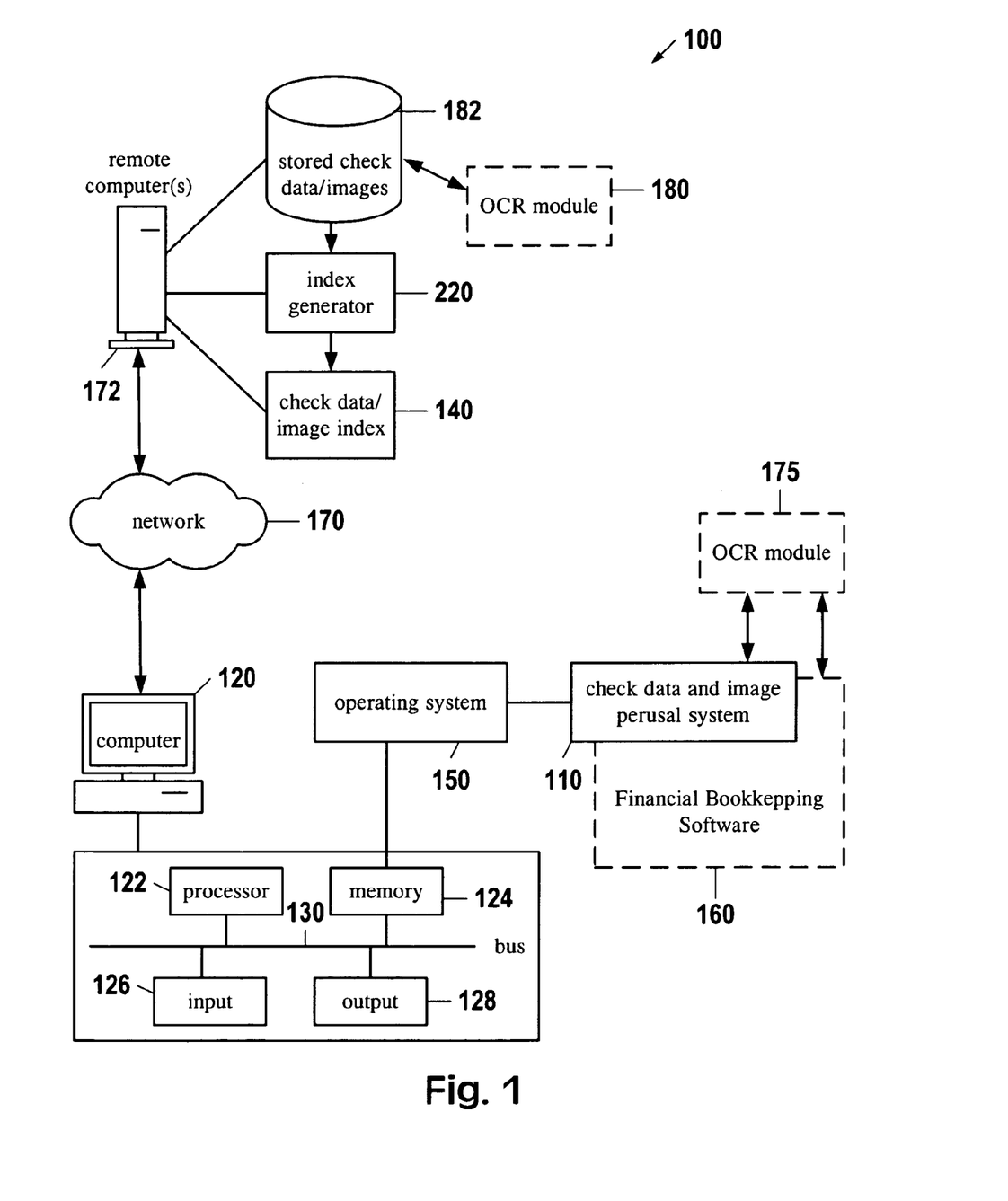
FIG. 1 is a block diagram of a computer system and network for use with a financial transaction indexing system.

FIG. 1 is a block diagram of a computer system and network 100 for use with a financial transaction indexing system.

First, a computer 120 is provided for a customer of a financial institution, comprising, as computers usually do, one or more processors 122, memory 124, one or more input devices 126, one or more output devices 128, and a data bus 130. The memory 124 and data bus 130 may optionally reside in the same integrated circuit package containing the processor 122. The memory 124 optionally includes but is not limited to any combination of the following: volatile random-access memory, flash memory, hard drives, floppy drives, compact disk drives, optical drives, connected to and accessible to the processor 122. The input devices 126 may include, but are not limited to, familiar devices such as computer mice, keyboards, scanners, communication ports, and touch screens. The output devices 128 may include, but are not limited to, familiar devices such as computer monitors, speakers, printers, communication ports, and other peripherals. Computer 120 is preferably linked via a network 170 (e.g., the Internet) to at least one of one or more remote computers 172, in order to provide registered customers of the financial institution with secure access to check images and any associated data stored by or on behalf of the financial institution.

The computer 120 is capable of running software programs, including an operating system 150. Those of ordinary skill in the art will appreciate that a computer is a machine and that the execution of a software program on the computer 120 produces useful, concrete, and tangible results. Also, it will be understood that the remote computers 172 are also machines that comprise one or more processors, memory, data transfer buses, and the like (not shown), and which produce useful, concrete, and tangible results.

At least one of the one or more remote computers 172 maintains a repository 182 of check images and associated data such as check number, date, amount and sometimes payee. An optical character recognition ("OCR") software module or program 180 may be provided to extract handwritten and/or printed information from any stored check images to identify such items as the payee listed on the check, information listed in the memo field, check numbers, account numbers, and the like. Alternatively or in addition, such information may be obtained by conventional data entry means.

The financial transaction indexing system comprises an index generator 220 residing on one of the remote computers 172 and a complementary or data-compatible check data and image perusal system 110 residing on the customer's computer 120. The index generator 220 generates an index 140, preferably a searchable index, of a subset (not illustrated) of the check images and associated data stored in the repository 182. The subset may comprise all, or anything less than all, of the check images and data stored in the repository 182. For example, the subset may be limited by date range, customer account number, and other variables.

If the bank's repository 182 of check images simply contains image files, one or more simple HTML files will preferably be generated to incorporate the image files. The index generator 220 will then index the HTML files.

Techniques for generating the index include, but are not limited to, techniques described in our co-pending patent application Ser. Nos. 10/449,306 and 09/257,714, both of which are herein incorporated by reference. It will be understood that the index 140 may be comprised of either a single archived file or multiple files, and that the index 140 may either directly incorporate the images into the index, simply provide links to check images stored in the repository 182 or elsewhere, or both.

The check data and image perusal system 110 is capable of downloading the generated index 140 and associated check images (whether the check images are incorporated into the index 140 or not), saving the index 140 to memory 124, and providing the customer with searchable access to the index and associated images. The check data and image perusal system 110 may be a full or stripped-down version of the information capturing and indexing system described in our co-pending patent application identified by Ser. No. 10/449, 306. For example, the check data and image perusal system 110 may include a graphical user interface and web browser that acts as a client to a remote web server and displays HTML files having formatting control tags in a graphical user interface in accordance with the formatting control tags of the HTML files. The check data and image perusal system 110 may also include a database selection module and a search module.

Alternatively, the check data and image perusal system 110 is a cooperative or integral part of a financial bookkeeping software program 160 (including, if permitted via license or assignment of any patent derived from this application, commercially well-known programs such as Intuit's Quicken™ and Quickbooks™ programs, Microsoft's Money™ program, and Peachtree's Peachtree Accounting™ program).

The check data and image perusal system 110 or financial bookkeeping software program 160 of which it is a part is also optionally equipped with an OCR module 175 to extract handwritten and/or printed information from any stored check images to identify such items as the payee listed on the check, information listed in the memo field, check numbers, account numbers, and the like, and record the corresponding financial transaction. The user of a financial bookkeeping software program 160 equipped with such capabilities could furthermore be given an opportunity to verify the information extracted from the check image. Such an embodiment would advantageously spare a user of a financial bookkeeping software program 160 the burden of manually entering such information to record a financial transaction. Persons of ordinary skill in the art of OCR will appreciate how to structure and code an OCR module 175 to extract such useful information from a check image.

Figure 2:
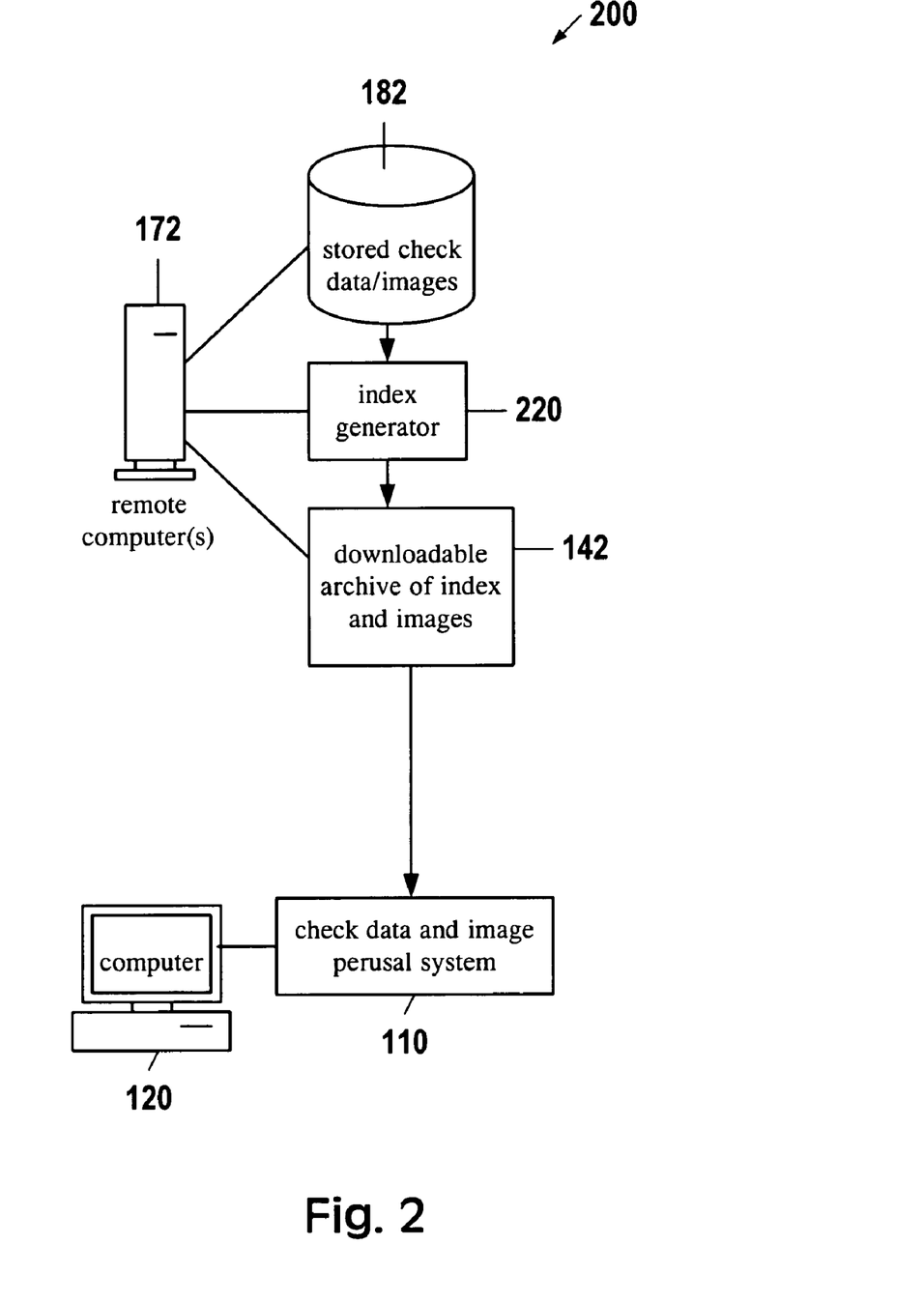
FIG. 2 is a block diagram of one embodiment of a financial transaction indexing system.

FIG. 2 is a block diagram of a simplified embodiment of a financial transaction indexing system 200, comprising one or more remote computers 172 serving a customer's account, a repository 182 of check images and associated data stored on one of the remote computers 172, an index generator 220 residing on one of the remote computers 172 operable to generate an index of the check images and associated data in the form of a downloadable archive 142, and a check data and image perusal system 110 operable to download the archive 142 to a customer's personal computer 120, extract the archive to a selectable database, and enable the customer to peruse or search the index.

The National Check Fraud Center reports that a type of check fraud known as "check washing" is growing at an alarming rate, defrauding consumers and financial institutions close to $1 billion per year. Check washing refers to the practice of erasing the ink on a stolen check (often using a common household cleaning product such as acetone, benzene, or bleach) and rewriting the amount or payee, or both, on the check. Generally, consumers who do not report any problem within 30 days of receiving their bank statements become liable for any losses. Those consumers (and there are many) who do not receive or check their cancelled or processed checks to verify that the amounts were paid to the proper payee risk falling victim to such frauds. And consumers who limit their verification efforts to confirming that their checks were cashed for the amount originally written on the check risk falling prey to thieves who check wash only the payee listed on the check.

Despite the long-felt need for systems to alert consumers to such frauds, vendors of popular financial transaction software programs have not, to the applicants' knowledge, conceived, reduced to practice, or sold versions of programs to effectively address this problem. Instead, year after year, many vendors seem content to crank out "new" versions of software that scarcely improve upon past versions, tinker with the interface, and do little more than churn (i.e., promote and demote between "standard," "professional," "premium" and subscription-based products) features introduced in previous versions of the software.

Figure 3:
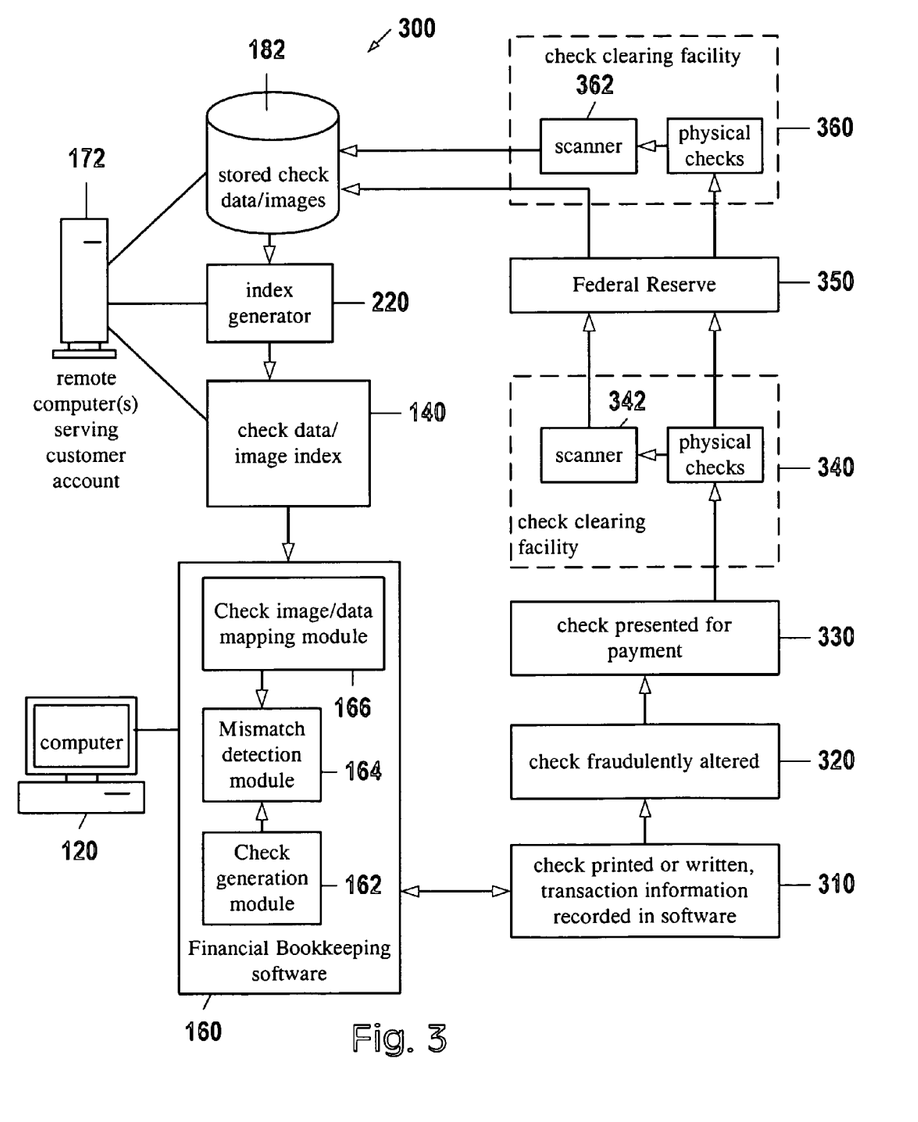
FIG. 3 is a block diagram of another embodiment of a financial transaction indexing system with fraud alert functionality.

FIG. 3 is a part physical, part functional block diagram of one embodiment of a financial transaction indexing system 300 operable to detect check-washing fraud. In step 310, the customer either writes a check and records the transaction information in the customer's financial bookkeeping software program 160, or uses a check generation module 162 of the financial bookkeeping software program 160 to print a check, with the program 160 automatically recording the transaction information. In step 320, the parts of the check identifying the original payee, the original amount of the check, or both, are fraudulently altered. In step 330, the check is presented for payment or deposit to a payor bank. The check then passes through the check clearing facility 340 serving the payor bank. There, either the physical check is sorted and passed onto the Federal Reserve 350, or imaging equipment 342 is used to scan front and back images of the physical check, and the physical check is thereafter destroyed. Then, either the physical check, or its image, is passed to the check clearing facility 360 serving the customer's bank. There, if the check has not already been imaged, imaging equipment 362 is used to scan front and back images of the physical check. The check images are then stored in the check data/image repository 182 of one of the remote computers 172 serving the customer's account. Although not illustrated in FIG. 3, additional information and data relating to the check, such as the identity of the payor bank, the date the check was presented, and the identity or account number of the depositor, may also be transmitted from the check clearing facility 340 or Federal Reserve 350 to the repository 182.

Next, the index generator 220 generates an index 140 of check data and images. The customer, using the financial bookkeeping software program 160 on his computer 120, accesses one of the remote computers 172 over the network and downloads the index 140, including the associated check images. Then, a check image/data mapping module 166 identifies the check numbers, payees, and check amounts reflected on the associated check images (using OCR capabilities, if necessary). A mismatch detection module 164 compares the check number, payee, and check amount identified by the mapping module 166 with the information manually entered or prerecorded by the customer or automatically recorded by the check generation module 162. If a mismatch is identified, the financial bookkeeping software 160 alerts the user. The financial bookkeeping software 160 is also optionally configured to transmit an alert over the network 170 to the financial institution serving the customer, the financial institution that cashed or deposited the check, or the Federal Reserve 350.

In an alternative embodiment, the mismatch detection module 162 is equipped to differentiate images using techniques known to persons of ordinary skill in the art. In this embodiment, the mismatch detection module 162 would compare an image of the check when written or printed with the image of the downloaded check. In one embodiment, the financial bookkeeping software 160 would infer what the original check image looked like on the basis of data stored about the type of check stock used and the information printed on the check through the check generation module 162. In other embodiment, the financial bookkeeping software 160 would obtain an image of the check produced by a scanner or imager (not shown).

Figure 4:
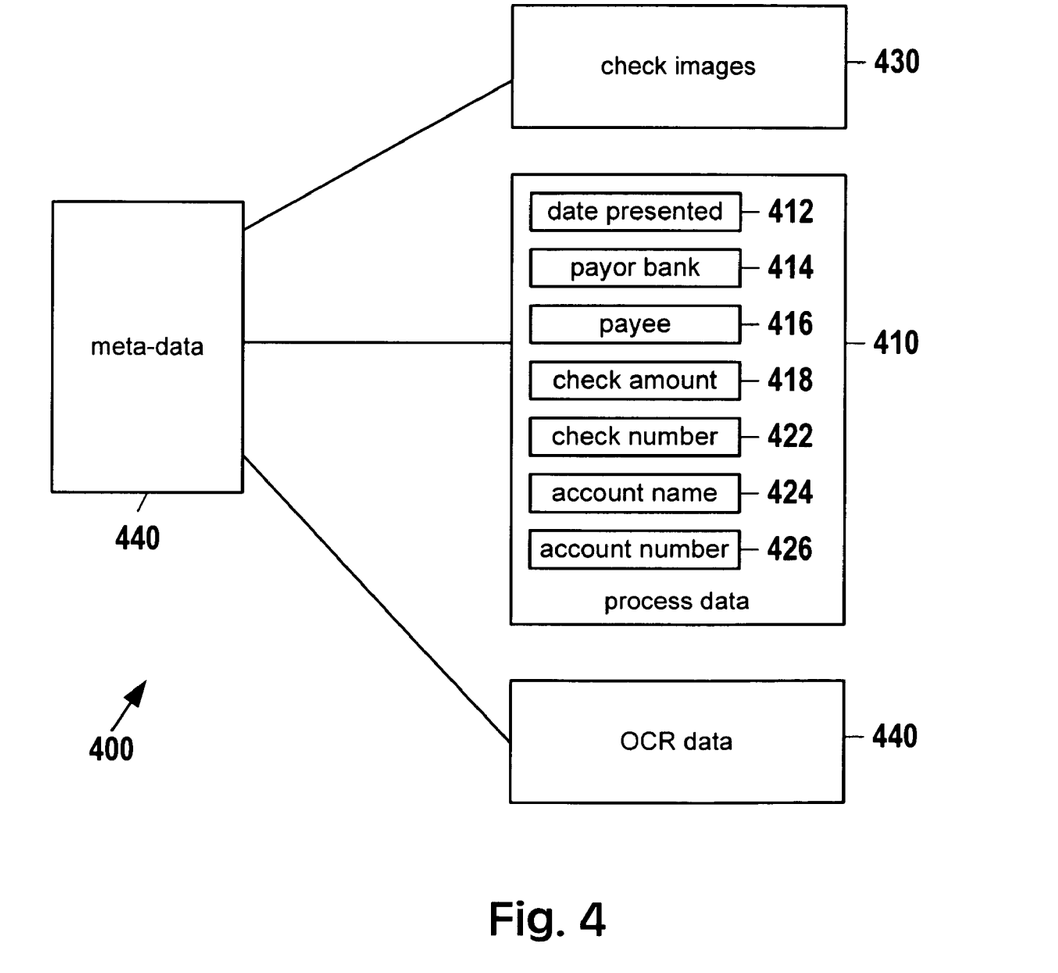
FIG. 4 is a block diagram of one embodiment of an index generated by the indexing system of FIG. 2.

FIG. 4 is a block diagram of one embodiment of an index 400 generated by the index generator 220 of FIGS. 1-3. Index 400 comprises meta-data 440 that documents data about data, including information for locating check images 430 and any related process data 410 or OCR data 440. The meta-data may also include descriptive information about the context, quality, condition, and characteristics of the check images 430, the process data 410, and the OCR data 440. Process data 410 generally refers to information that the financial institution has obtained and recorded as part of the check clearing process. Such information may include, but is not limited to, the check presentment date 412, the payor bank's identity 414, the payee's identity 416, the check amount 416, the check number 422, the account name 424, and the account number 426.

The word "index," as used in the specification, unless specified otherwise or unless otherwise mandated by the context, may either refer to the meta-data 440 exclusive of the check images 430, process data 410, and OCR data 440 (if any) associated with the meta-data 440, or to the meta-data 440 together with the check images 430, process data 410, and OCR data 440 (or a copy or derivation of the same).

Figure 5:
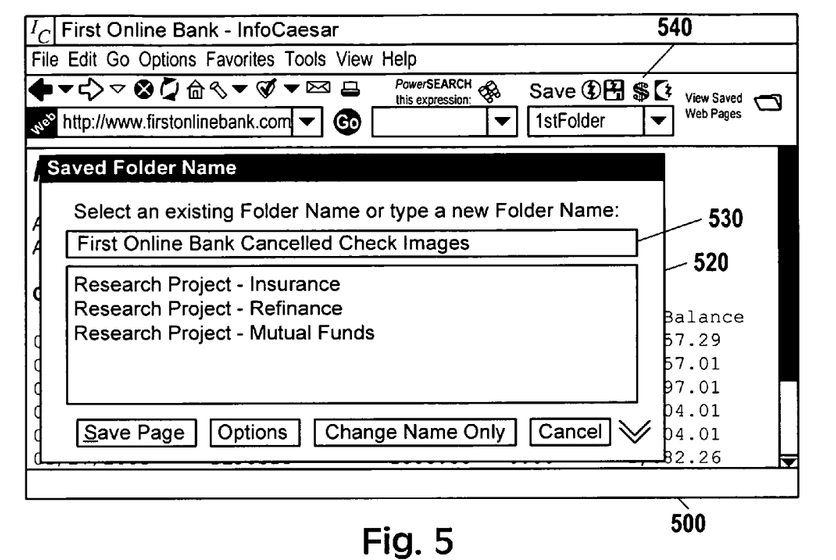
FIG. 5 is a screen display of a folder selection dialog box of one embodiment of a system for organizing financial transaction information and images.

FIG. 5 is a screen display 500 of a folder selection dialog box 520 with which one embodiment of the check data and image perusal system 110 (FIG. 2) prompts a user to define or select a database or folder 530 into which to save the downloadable archive 142 generated by the index generator 220. Information about database and file selection structures optionally incorporated into the check data and image perusal system 110 are described in our co-pending patent application for "A Database System and Method for Data Acquisition and Perusal" filed on Feb. 25, 1999, having Ser. No. 09/257, 714, which application is herein incorporated by reference. That application also describes a search module that may optionally be incorporated into the check data and image perusal system.

Figure 6:
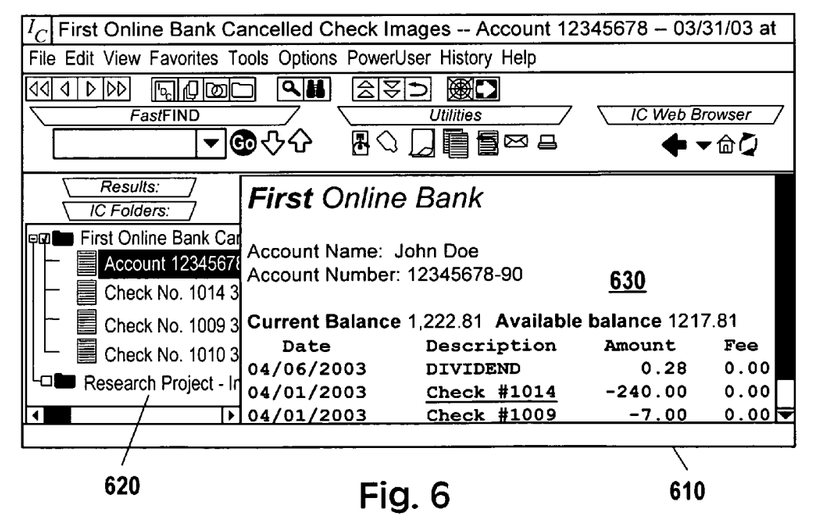
FIG. 6 is a screen display of a system for organizing financial transaction information and images displaying downloaded account information.

FIG. 6 is a screen display 610 of a folder view of one embodiment of the check data and image perusal system 110. The folder view pane 620 lists a group of files saved in a folder entitled "First Online Bank Canceled Check Images." Of the listed files, the index file entitled "Account 12345678" is selected and displayed within a file view pane 630.

Figure 7:
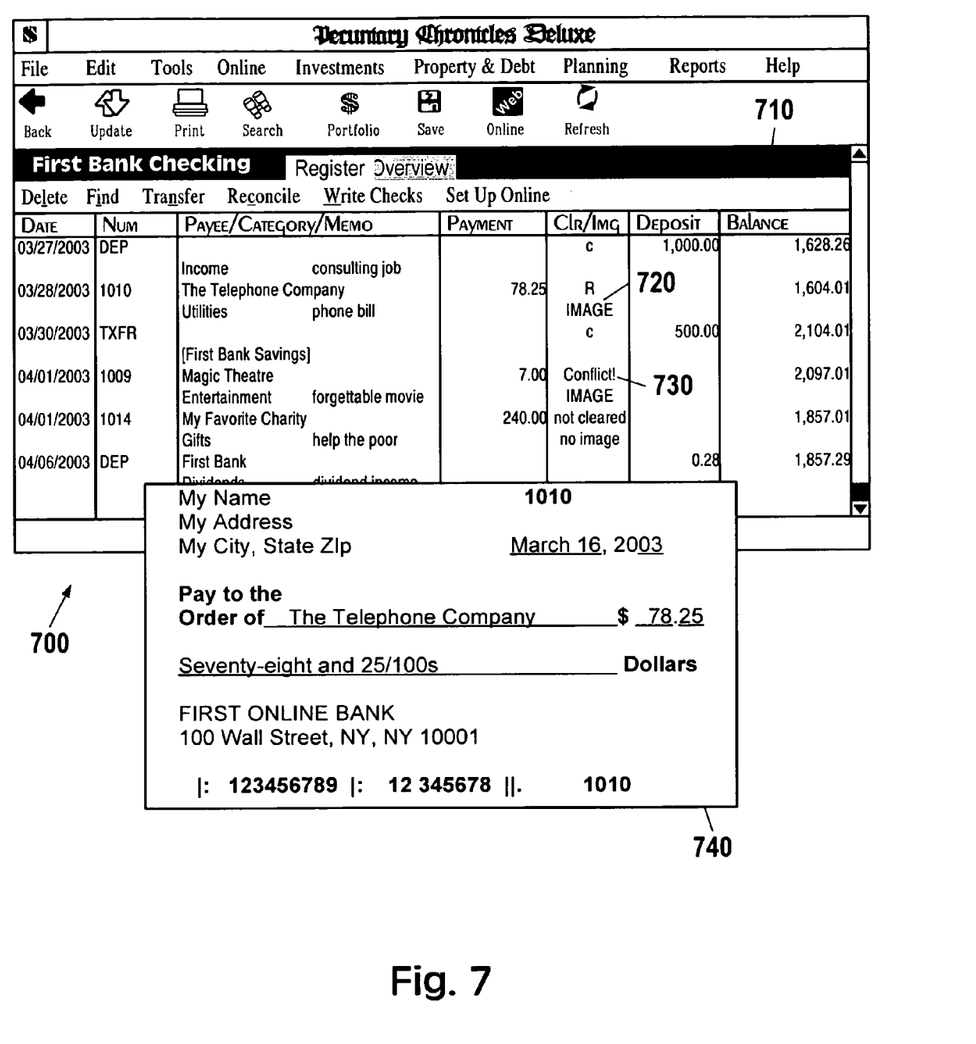
FIG. 7 is a screen display of a financial bookkeeping software program with a transaction register that associates a downloaded image with the corresponding transaction.

FIG. 7 illustrates one embodiment of a screen display 700 of a financial bookkeeping software program 160 that maintains a record of all account transactions affecting the customer's account's balance in an account register 710. The financial bookkeeping software program 160 associates downloaded cleared check images with their corresponding account transaction in the account register. For example, the financial bookkeeping software program 160 provides a link 720 between an account transaction for check number 1010 and an associated cleared check image 740. Preferably, the financial bookkeeping software program 160 is operable to compare information about a cleared check image in a downloaded archive with prerecorded information about the cleared check, and provide a signal 930 if any conflict is noted between the prerecorded and the downloaded information.

Figure 8:
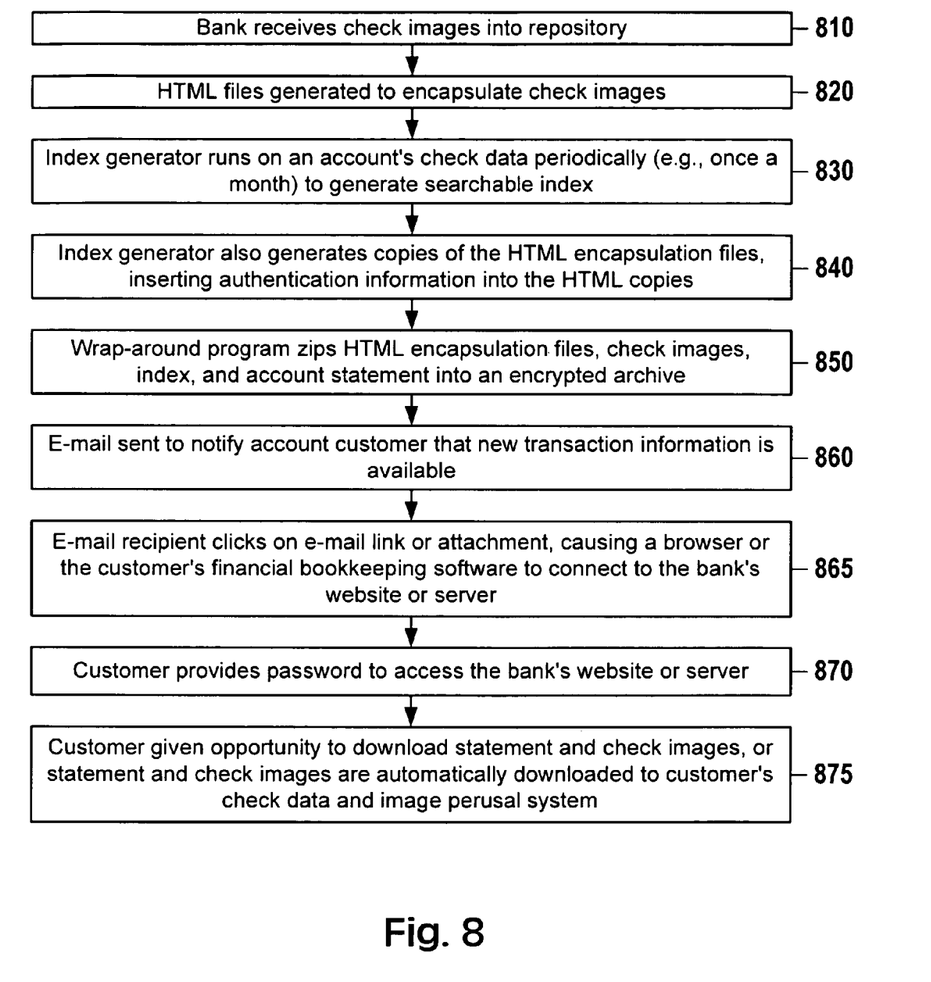
FIG. 8 is a functional block diagram of the method and operation of one embodiment of a financial transaction indexing system.

FIG. 8 is a functional block diagram of the method and operation of one embodiment of a financial transaction indexing system. In step 810, the bank receives check images into repository 182. In step 820, HTML files are generated to encapsulate the check images. In step 830, the index generator 220 runs on an account's check data periodically (for example, once a month for typical personal checking accounts, or more frequently for high-volume business accounts), generating a searchable index of the check data for that period. For example, the index generator 220 might operate on approximately 3% of the accounts on the first day of the month, another 3% of the accounts on the second day of the month, and so on, in order to make the most efficient use of the bank's computational resources.

As illustrated in block 840, the index generation process preferably creates copies of the HTML encapsulation files and inserts authentication information (such as a hash code) into the HTML files. Authentication methods are disclosed in our parent patent application Ser. No. 10/449,306. Preferably, the hash codes are generated from the content of both the HTML encapsulation file and the digital check image(s) it encapsulates. In this manner, alterations to either the encapsulation file or the digital check image(s) can be detected.

In step 850, a wrap-around program (which may be separate from or an integral module of the index generator) zips the HTML encapsulation files, check images, index, and optionally also an account statement into an encrypted and preferably password-protected archive 142. In step 860, one of the remote computers 172 serving the bank sends the account customer an e-mail notifying the customer that new transaction information (such as an account statement or a check image archive) is available. In step 865, the customer clicks or executes an e-mail link or attachment, which causes the customer's browser or financial bookkeeping software 160 to connect to the bank's website or server.

In step 870, the customer provides a password to access the bank's website or server. The financial bookkeeping software 160 may also exchange one or more encryption keys with the remote computer 172 to safeguard the information transaction. After the customer is logged in, in step 875 the customer is given the opportunity to download a statement and the indexed check image archive 142. Alternatively, the indexed check image archive 142 is automatically downloaded to the customer's financial bookkeeping software 160 or check data and perusal system 110.

Figure 9:
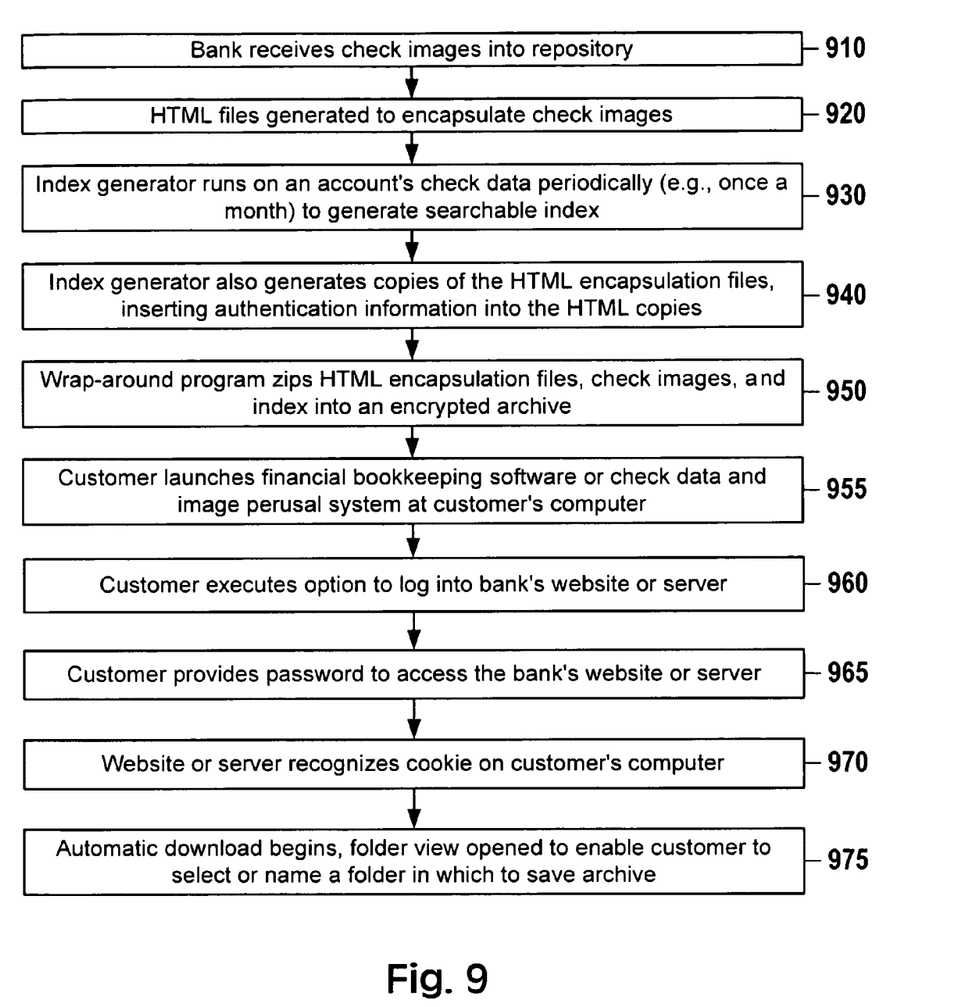
FIG. 9 is a functional block diagram of the method and operation of another embodiment of a financial transaction indexing system.

FIG. 9 is a functional block diagram of the method and operation of another embodiment of a financial transaction indexing system. Steps 910-950 are like steps 810-850. In step 910, the bank receives check images into repository 182. In step 920, HTML files are generated to encapsulate the check images. In step 930, the index generator 220 runs on an account's check data periodically. As illustrated in block 940, the index generation process preferably creates copies of the HTML encapsulation files and inserts authentication information into the HTML files. In step 950, a wrap-around program zips the HTML encapsulation files, check images, index, and optionally also an account statement into an encrypted archive 142.

In step 955, the customer launches the financial bookkeeping software program 160, a check data and perusal system 110, or a regular browser like Microsoft's Internet Explorer® resident on computer 120. In step 960, the customer executes an option to log into the bank's website or server. In a financial bookkeeping software program 160, this might be accomplished by selecting a "download transactions" option or something similar. In a regular browser or in a check data and perusal system 110 equipped with a browser, this might be accomplished by directing the browser to a website for perusing the customer's account information. In step 965, the customer provides a password to access the bank's website or server. One or more encryption keys may also be exchanged to provide secure access to the transaction information. If a regular browser is used, then in step 970, the website or server recognizes a cookie on the customer's computer, and instructions are executed to launch the customer's financial bookkeeping software 160 or check data and perusal system 110. Alternatively, if the website has been accessed through the browser of a check data and perusal system 110, the customer may click on a button (like the dollar sign icon 540 in FIG. 5) or select a menu option to send a code to the remote computer 172 asking it to download any available indexed check image archives 142.

In step 975, the indexed check image archives 142 are downloaded to the customer's computer 120. If operated through the customer's check data and perusal system 110, a folder selection dialog box 520 is opened to prompt the customer to define or select a database or folder 530 into which to save the downloadable archive 142 generated by the index generator 220.

Persons of ordinary skill in the art, enlightened by the present specification and those incorporated by reference, will understand how to build a system or write software code capable of carrying out the inventive concepts disclosed herein.

It will be seen that the invention can be expressed in many structurally or functionally distinct ways, in varying degrees of scope, and with many different combinations of elements. A first and preferred embodiment can be expressed as a method of recording and perusing financial transaction information comprising the steps of providing an index generating software program to a financial institution for use on a first computer, the index generating software program being operable to generate a downloadable index of images of cleared checks; and providing a customer of the financial institution with complementary software for use on a second computer, the complementary software being operable to remotely download the downloadable index of images of cleared checks, together with the images of the cleared checks, and to display the images of the cleared checks.

A second embodiment can be expressed like the first, but further comprising the step of incorporating copies of the images of the cleared checks into the downloadable index. A third embodiment can be expressed like any of the first two embodiments, wherein the complementary software also provides an interface and a database selection module for recording the customer's financial transactions. A fourth embodiment can be expressed like any of the first three embodiments, further comprising providing the customer with a checking account ledger or register for recording the customer's checking account transactions; and wherein the complementary software is operable to record financial transactions in the checking account ledger corresponding to the check images in the downloadable index.

A fifth embodiment can be expressed like any of the first four embodiments, wherein the index is a searchable index, and wherein the complementary software also provides the customer with the ability to search according to check number and to generate a search result that displays an image of the check corresponding to a searched-for check number together with textual information stored in the index identifying the check image.

A sixth and preferred embodiment can be expressed as a method of recording and perusing financial transaction information comprising the steps of providing a checking account customer of a financial institution with access over a network to images of checks that have cleared the customer's checking account; providing the checking account customer with a financial transaction bookkeeping software program for use on a computer, the financial transaction bookkeeping software program being operable to: set up a checking account ledger for recording the customer's checking account transactions; download and store copies of the cleared check images; and provide the customer with access to the stored copies of the cleared check images through the checking account ledger.

A seventh embodiment can be expressed like the sixth embodiment, wherein the financial transaction bookkeeping software program is operable to record financial transactions in the checking account ledger corresponding to the check images in the downloadable index.

An eighth embodiment can be expressed like the sixth or seventh embodiments, further comprising the steps of: providing the checking account customer with access to transactional text data corresponding to the cleared check images; and using the financial transaction bookkeeping software program to download the transactional text data together with copies of the corresponding cleared check images.

A ninth embodiment can be expressed like the sixth, seventh, or eighth embodiments, further comprising the step of recording the downloaded transactional text data in the customer's checking account ledger. A tenth embodiment can be expressed like the eighth embodiment, further comprising the steps of: prerecording a financial transaction corresponding to a check; downloading an image of the check, together with the corresponding transactional text data, after it has cleared; comparing the prerecorded information with the downloaded transaction information; and alerting the customer if there is a mismatch between the prerecorded information and the downloaded transaction information.

An eleventh embodiment can be expressed like the tenth embodiment, further comprising the steps of: printing a check through the financial transaction bookkeeping software; and prerecording the financial transaction based on the information printed on the check. A twelfth embodiment can be expressed like the tenth embodiment, further comprising the steps of: receiving an image of a check before it has cleared; running an optical character recognition process on the check image to identify transactional textual information on the check image; and prerecording the financial transaction corresponding to the check by storing the optically-recognized transactional textual information in the customer's checking account ledger.

A thirteenth embodiment can be expressed like any of the seventh through twelfth embodiments, wherein the financial transaction bookkeeping software program is integrated with an optical character recognition module operable to identify typed or written information in a cleared check image.

A fourteenth embodiment can be expressed like the thirteenth embodiment, further comprising the steps of: prerecording a financial transaction corresponding to a check; downloading an image of the check after it has cleared; running an optical character recognition process on the check image to identify typed or written information on the check image; comparing the prerecorded information with the optically recognized information; and alerting the customer if there is a mismatch between the prerecorded information and the optically recognized information.

A fifteenth and preferred embodiment can be expressed as a financial transaction indexing system comprising: index generating software residing on a remote computer serving a financial institution, the index generating software being operable to generate an index of images of cleared checks maintained for the financial institution; and an index downloading software module residing on a personal computer serving a customer of the financial institution, the software module being operable to remotely access and download the index together with the cleared check images to the customer's personal computer.

A sixteenth embodiment can be expressed like the fifteenth embodiment, wherein the index generating software is operable to generate a single file archive of the check together with the corresponding cleared check images, and wherein the index downloading software module is operable to remotely access and download the archive.

A seventeenth embodiment can be expressed like any of the fifteenth or sixteenth embodiments, further comprising: a financial transaction software program residing on the customer's personal computer, the financial transaction software program being operable to maintain a database of the customer's financial transactions, the financial transaction software program being further operable to store the downloaded index together with the cleared check images; wherein the index downloading software module is integrated with the financial transaction software program.

An eighteenth embodiment can be expressed like the fifteenth, sixteenth, or seventeenth embodiments, further comprising a check data and image perusal software module interfaced with the index downloading software module and operable to display the check images together with textual data identifying the check images. A nineteenth embodiment can be expressed like any of the fifteenth through eighteenth embodiments, further comprising a check data and image perusal software module interfaced with the index downloading software module and operable to search the downloaded index according to check number and to generate a search result that displays an image of the check corresponding to a searched-for check number together with textual information stored in the index identifying the check image. A twentieth embodiment can be expressed like any of the first nineteen embodiments, further comprising the step of, or means for, detecting possible check washing fraud.

A twenty-first and preferred embodiment can be expressed as a method of preparing and transmitting financial transaction information from a financial institution to an account customer of the financial institution, the method comprising the steps of: providing the financial institution with a software program to run on a computer serving the financial institution; providing the software program with access to digital images of cleared checks drawn from the customer's account; using the software program to periodically generate digital archives of the cleared check images for the account customer; providing the account customer with secure online access to the digital archives; and enabling the account customer to download and store the digital archives of cleared check images.

A twenty-second embodiment can be expressed like the twentieth embodiment, further comprising the step of e-mailing the account customer a notice after a digital archive has been generated. A twenty-third embodiment can be expressed like the twenty-second embodiment, wherein the e-mail contains a link to a web page that enables the account customer to enter a password in order to obtain secure online access to the digital archives. A twenty-fourth embodiment can be expressed like any of the twenty-first through twenty-third embodiments, further comprising the step of providing the account customer with a computer program operable to read a downloaded digital archive and display the cleared check images in the downloaded digital archive.

A twenty-fifth embodiment can be expressed like the twenty-fourth embodiment, wherein the computer program is a financial bookkeeping software program operable to maintain a record of all account transactions affecting the customer's account's balance in an account register. A twenty-sixth embodiment can be expressed like the twenty-fifth embodiment, wherein the financial bookkeeping software program associates the downloaded cleared check images with an associated account transaction in the account register. A twenty-seventh embodiment can be expressed like the twenty-sixth embodiment, wherein the financial bookkeeping software program is operable to provide a link between an account transaction and an associated cleared check image. A twenty-eighth embodiment can be expressed like any of the twenty-sixth or twenty-seventh embodiments, wherein the financial bookkeeping software program is operable to compare information about a cleared check image in a downloaded archive with prerecorded information about the cleared check.

A twenty-ninth embodiment can be expressed like any of the twenty-first through twenty-eighth embodiments, further comprising the steps of: providing HTML files to encapsulate the cleared check images; generating searchable indexes of the HTML files; and incorporating the searchable indexes into the digital archives. A thirtieth embodiment can be expressed like the twenty-ninth embodiment, further comprising the step of providing the account customer with a computer program operable to unpack or store a downloaded digital archive into a folder or database, search the searchable index, and display the cleared check images.

Although the foregoing specific details describe various preferred embodiments of this invention, persons reasonably skilled in the art will recognize that various changes may be made in the details of the method and apparatus of this invention without departing from the spirit and scope of the invention as defined in the appended claims. Therefore, it should be understood that, unless otherwise specified, this invention is not to be limited to the specific details shown and described herein.

We claim:

1. A method of recording and perusing financial transaction information comprising the steps of: providing an index generating software program to a financial institution for use on a first computer, the index generating software program being operable to generate a downloadable customer-specific index and archive of images of multiple cleared paper checks; and providing a customer of the financial institution with complementary software for use on a second computer, the complementary software being operable to remotely download the downloadable customer-specific index and archive of images of multiple cleared paper checks, wherein the archive contains images of the cleared paper checks, and to display the images of the cleared paper checks.

2. The method of claim 1, further comprising the steps of:
  incorporating the archive of images of multiple cleared paper checks into the downloadable index; and
  incorporating a corresponding account statement into the downloadable index.

3. The method of claim 2, wherein the complementary software also provides an interface and a database selection module for recording the customer's financial transactions.

4. The method of claim 3, further comprising providing the customer with a checking account ledger for recording the customer's checking account transactions; wherein the complementary software is operable to record financial transactions in the checking account ledger corresponding to the check images in the downloadable index.

5. The method of claim 1, wherein the index is a searchable index, and wherein the complementary software also provides the customer with the ability to search according to check number and to generate a search result that displays an image of the check corresponding to a searched-for check number together with textual information stored in the index identifying the check image.

6. A method of recording and perusing financial transaction information comprising the steps of: providing a checking account customer of a financial institution with access over a network to images of paper checks that have cleared the customer's checking account; providing the checking account customer with a financial transaction bookkeeping software program for use on a computer, the financial transaction bookkeeping software program being operable to: set up a checking account ledger for recording the customer's checking account transactions; download and store copies of the cleared paper check images; and provide the customer with access to the stored copies of the cleared paper check images through the checking account ledger.

7. The method of claim 6, wherein the financial transaction bookkeeping software program is operable to record financial transactions in the checking account ledger corresponding to downloaded check images.

8. The method of claim 7, further comprising the steps of: providing the checking account customer with access to transactional text data corresponding to the cleared paper check images; and using the financial transaction bookkeeping software program to download the transactional text data together with copies of the corresponding cleared check images.

9. The method of claim 8, further comprising the step of recording the downloaded transactional text data in the customer's checking account ledger.

10. The method of claim 8, further comprising the steps of: prerecording a financial transaction corresponding to a check; downloading an image of the check, together with the corresponding transactional text data, after it has cleared; comparing the prerecorded information with the downloaded transaction information; and alerting the customer if there is a mismatch between the prerecorded information and the downloaded transaction information.

11. The method of claim 10, further comprising the steps of: printing a check that has not yet been presented for payment through the financial transaction bookkeeping software; and prerecording the financial transaction based on the information printed on the check.

12. The method of claim 10, further comprising the steps of: receiving an image of a check before it has cleared; running an optical character recognition process on the check image to identify transactional textual information on the check image; and prerecording the financial transaction corresponding to the check by storing the optically-recognized transactional textual information in the customer's checking account ledger.

13. The method of claim 7, wherein the financial transaction bookkeeping software program is integrated with an optical character recognition module operable to identify typed or written information in a cleared check image.

14. The method of claim 13, further comprising the steps of: prerecording a financial transaction corresponding to a check; downloading an image of the check after it has cleared; running an optical character recognition process on the check image to identify typed or written information on the check image; comparing the prerecorded information with the optically recognized information; and alerting the customer if there is a mismatch between the prerecorded information and the optically recognized information.

15. A financial transaction indexing system comprising: index generating software residing on a remote computer serving a financial institution, the index generating software being operable to generate a customer-specific index and a customer-specific archive of images of multiple cleared paper checks maintained for the financial institution; and an index downloading software module residing on a personal computer serving a customer of the financial institution, the software module being operable to remotely access and download the customer-specific index together with the customer-specific archive of multiple cleared paper check images to the customer's personal computer.

16. The financial transaction indexing system of claim 15, wherein the index generating software is operable to generate a single file archive of the checks together with the corresponding cleared check images and a corresponding account statement, and wherein the index downloading software module is operable to remotely access and download the archive.

17. The financial transaction indexing system of claim 15, further comprising: a financial transaction bookkeeping software program residing on the customer's personal computer, the financial transaction bookkeeping software program being operable to maintain a database of the customer's financial transactions and track a running balance of a checking account, the financial transaction software program being further operable to store the downloaded index together with the cleared check images; wherein the index downloading software module is integrated with the financial transaction software program.

18. The financial transaction indexing system of claim 15, further comprising: a check data and image perusal software module interfaced with the index downloading software module and operable to display the check images together with textual data identifying the check images.

19. The financial transaction indexing system of claim 15, further comprising: a check data and image perusal software module interfaced with the index downloading software module and operable to search the downloaded index according to check number and to generate a search result that displays an image of the check corresponding to a searched-for check number together with textual information stored in the index identifying the check image.

20. The financial transaction indexing system of claim 15, further comprising means for detecting possible check washing fraud.

21. A method of preparing and transmitting financial transaction information from a financial institution to an account customer of the financial institution, the method comprising the steps of: providing the financial institution with a software program to run on a computer serving the financial institution; providing the software program with access to digital images of cleared paper checks drawn from the customer's account; using the software program to periodically generate customer-specific digital archives of the cleared paper check images for the account customer, each archive containing the images of multiple cleared paper checks; providing the account customer with secure online access to the customer-specific digital archives; and enabling the account customer to download and store the digital archives of cleared paper check images.

22. The method of claim 21, further comprising the step of e-mailing the account customer a notice after a digital archive has been generated.

23. The method of claim 22, wherein the e-mail contains a link to a web page that enables the account customer to enter a password in order to obtain secure online access to the digital archives.

24. The method of claim 21, further comprising the step of providing the account customer with a computer program operable to read a downloaded digital archive and display the cleared check images in the downloaded digital archive.

25. The method of claim 24, wherein the computer program is a financial bookkeeping software program operable to maintain a record of all account transactions affecting the customer's account's balance in an account register.

26. The method of claim 25, wherein the financial bookkeeping software program associates the downloaded cleared check images with an associated account transaction in the account register.

27. The method of claim 26, wherein the financial bookkeeping software program is operable to provide a link between an account transaction and an associated cleared check image.

28. The method of claim 27, wherein the financial bookkeeping software program is operable to compare information about a cleared check image in a downloaded archive with prerecorded information about the cleared check.

29. The method of claim 21, further comprising the steps of: providing HTML files to encapsulate the cleared check images; generating searchable indexes of the HTML files; and incorporating the searchable indexes into the digital archives.

30. The method of claim 29, further comprising the step of providing the account customer with a computer program operable to unpack or store a downloaded digital archive into a folder or database, search the searchable index, and display the cleared check images.

31. A method for a financial institution to deliver an electronic financial statement to a customer including financial check and transaction images and a searchable index, comprising the steps of: creating a customer-specific archive of images of a plurality of a financial account customer's paper checks and transactions that have cleared the customer's financial account; creating a customer-specific search index of preselected check information that is linked to the corresponding images of a financial account customer's paper checks and transactions; and downloading the customer-specific archive of images and customer-specific search index from the financial institution into a computer software application on the customer's computer system that allows the customer to search the preselected fields and view any of the corresponding paper check images.

32. The method of claim 31, wherein the customer's computer system enables the customer to audit and review the financial statements and to search the preselected fields and view any of the corresponding check images without any further indexing.

* * * * *